(12) United States Patent
Amoss et al.

(10) Patent No.: US 7,552,913 B1
(45) Date of Patent: Jun. 30, 2009

(54) LOAD BINDER APPARATUS

(76) Inventors: Robert S. Amoss, 3118 Ursulines Ave., New Orleans, LA (US) 70119; Mark Amoss, 229 Rio Vista Ave., Jefferson, LA (US) 70121

( * ) Notice: Subject to any disclaimer, the term of this patent is extended or adjusted under 35 U.S.C. 154(b) by 33 days.

(21) Appl. No.: 11/687,867

(22) Filed: Mar. 19, 2007

Related U.S. Application Data

(60) Provisional application No. 60/744,653, filed on Apr. 11, 2006, provisional application No. 60/783,646, filed on Mar. 17, 2006.

(51) Int. Cl.
*B21F 9/00* (2006.01)
(52) U.S. Cl. .................. 254/235; 254/233; 254/234; 254/237; 403/44; 403/45
(58) Field of Classification Search ............. 254/235, 254/236, 233, 234, 237; 403/202, 43, 44, 403/45
See application file for complete search history.

(56) References Cited

U.S. PATENT DOCUMENTS

| 1,971,472 | A | 8/1934 | Wolf |
| 3,065,007 | A | 1/1962 | Colmer, Jr. |
| 3,050,800 | A | 8/1962 | Kernahan |
| 4,081,219 | A | 3/1978 | Dykmans |
| 4,100,875 | A | 7/1978 | Patterson, III et al. |
| 4,130,269 | A | 12/1978 | Schreyer |
| 4,198,174 | A | 4/1980 | Borowiec et al. |
| 4,830,339 | A | 5/1989 | McGee et al. |
| 5,611,521 | A | 3/1997 | Grover et al. |

*Primary Examiner*—Emmanuel M Marcelo
(74) *Attorney, Agent, or Firm*—Garvey, Smith, Nehrbass & North, L.L.C.; Seth M. Nehrbass; Charles C. Garvey, Jr.

(57) ABSTRACT

A load binder mechanism is disclosed that has an improved arrangement for connecting the hook and shaft end portions of the load binder to the elongated axially extending tubular body. The load binder mechanism of the present invention provides an axially extending tubular body having opposed end portions, each end portion being fitted with a sleeve that has both internal and external threads. The load binder mechanism includes first and second attachment members, each providing a shaft with an externally threaded portion. The attachment member shafts have respective right and left-hand thread patterns that engage correspondingly threaded internal bore sections of the sleeves.

24 Claims, 2 Drawing Sheets

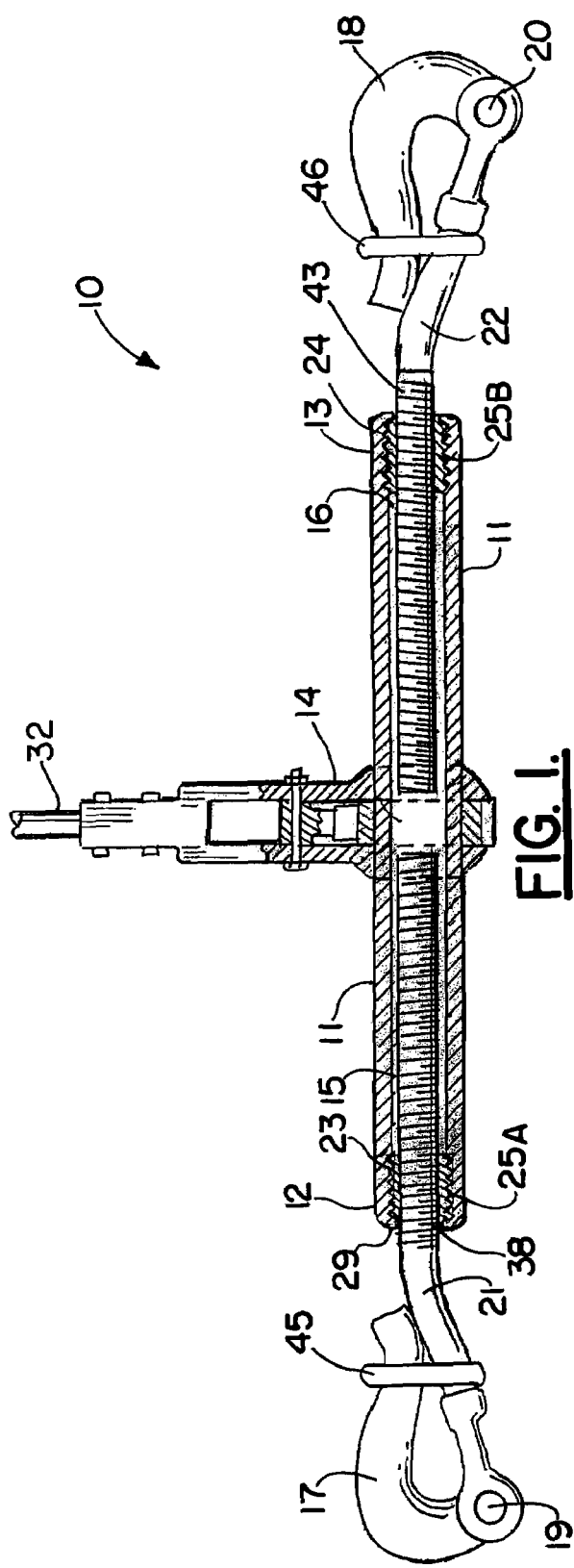
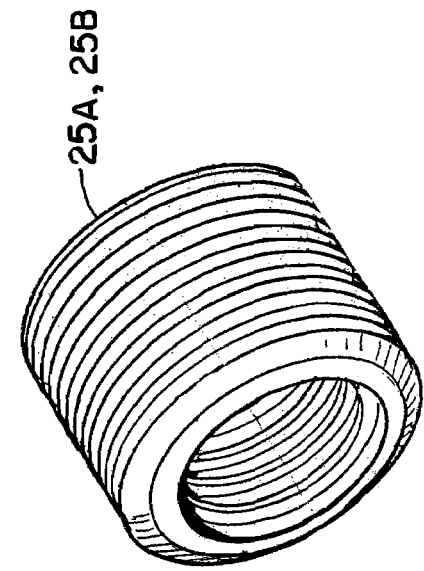
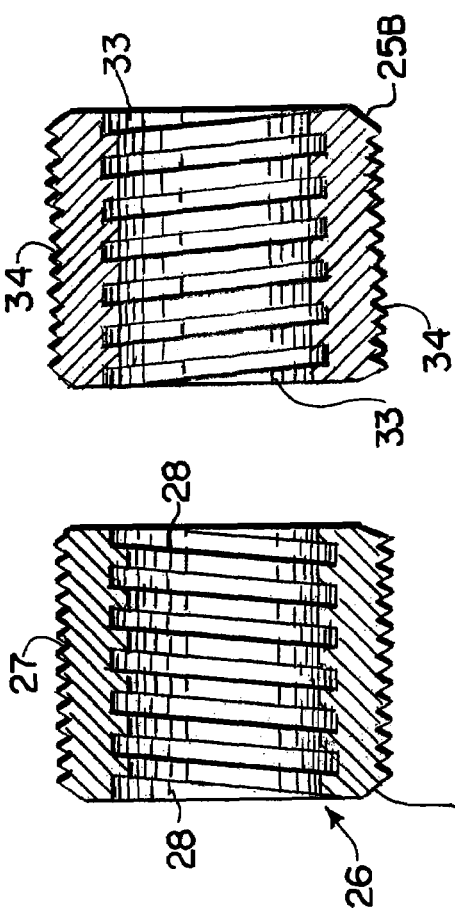

LOAD BINDER APPARATUS

CROSS-REFERENCE TO RELATED APPLICATIONS

Priority of our U.S. Provisional Patent Application Ser. No. 60/744,653, filed 11 Apr. 2006, incorporated herein by reference, is hereby claimed. Priority of our U.S. Provisional Patent Application Ser. No. 60/783,646, filed 17 Mar. 2006, incorporated herein by reference, is also hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to load binding devices that employ a tubular body with a ratchet mechanism to pull two end mounted shafts having hooks toward each other (or other attachment members such as eyes, jaws, or stub ends suitable for attachment such as by welding). More particularly, the present invention relates to an improved load binder wherein the connection of the hook member to the tubular body provides a sleeve that is both internally and externally threaded, the internal threads forming a connection with the hook shaft while the internal threads form a connection with the tubular body.

2. General Background of the Invention

Devices have been commercialized for many years that provide a ratchet operated turn buckle or load binder mechanism for pulling two selected loads or parts together. These devices typically employ a ratchet mechanism with a handle that is reciprocated back and forth by a user when the user grips the handle and pushes it away from or pulls it toward his or her body. The ratchet mechanism rotates a tubular body to which is connected a pair of opposed attachment members having threaded shafts (e.g. hooks, pelican hooks, eyes, jaws, or stub ends suitable for attachment such as by welding). The attachment members have respective right and left hand thread patterns that join them to the tubular body so that rotation of the tubular body in one direction pulls the attachment members together while rotation in the other direction pushes the attachment members apart.

Formerly, in river ratchets, an insert (threaded on the inside only) was added to the inside of the ends of barrels and then welding the insert to the ends of the barrels.

Then, an improvement to that system involved forging the ends of the barrels, then the ends were threaded to accept the threaded hooks.

Generally speaking, many patents have issued for such turnbuckle type load binding mechanisms. Examples can be found in the following table, each of which is incorporated herein by reference.

TABLE 1

| PATENT NO. | TITLE | ISSUE DATE |
| --- | --- | --- |
| 1,971,472 | Steamboat Ratchet | Aug. 28, 1934 |
| 3,050,800 | Pelican Hook for Ratchet Couplings | Jun. 21, 1961 |
| 3,065,007 | Take-Up Device | Jan. 2, 1962 |
| 4,081,219 | Coupler | Mar. 28, 1978 |

TABLE 1-continued

| PATENT NO. | TITLE | ISSUE DATE |
| --- | --- | --- |
| 4,100,875 | Connectors | Jul. 18, 1978 |
| 4,130,269 | Telescopic Turnbuckle | Dec. 19, 1978 |
| 4,198,174 | Telescopic Load Binder and Method of Assembly | Apr. 15, 1980 |
| 4,830,339 | Power Drive for Cable Tightener | May 16, 1989 |
| 5,611,521 | Power Drive for Cable Tightener | Mar. 18, 1997 |

U.S. Pat. No. 4,198,174 discloses a load binder with a threaded barrel threaded into the main body to accept a second threaded member. The threaded barrel is placed inside a threaded tube to accept a threaded shaft.

U.S. Pat. No. 4,081,219 discloses an adjustable coupler with an internally and externally threaded reducer for receiving a threaded bar.

U.S. Pat. No. 4,130,269 discloses a steamboat ratchet with pelican hooks on both ends that have been threaded into the main support tube holding the ratchet gears.

U.S. Pat. Nos. 1,971,472 and 3,050,800 disclose pelican hooks threaded into steamboat ratchets.

U.S. Pat. No. 3,065,007 discloses an internally threaded tube that aids in moving externally threaded nuts inside the tube (see column 2, lines 3+).

U.S. Pat. No. 4,100,875 discloses a pelican hook on one end and a connection on the other end.

BRIEF SUMMARY OF THE INVENTION

The present invention provides an improved load binder apparatus. The apparatus includes an axially extending tubular body having opposed end portions, internal longitudinal bore sections that provide internally threaded sections at opposed end portions of the tubular body.

A pair of sleeves are provided, each fitted to a respective end portion of the tubular body, each sleeve occupying a part of the longitudinal bore next to an end portion.

Each sleeve has a central longitudinal bore and provides two threaded portions including an outer threaded portion with external threads that engage the internally threaded part of the bore at the tubular body end and an internal thread. One sleeve provides an internal thread that is a right-hand thread, the other sleeve provides an internal thread that is a left-hand thread. Each sleeve internally threaded portion accepts a correspondingly threaded shaft having a selected part (such as a hook) for forming a connection to a selected object.

The present invention includes a steamboat ratchet or river ratchet, used to connect together two wire ropes and then ratchet them together to make connections on barges, including a ratchet barrel having threaded ends, internally and externally threaded inserts threadedly inserted into the threaded ends of the ratchet barrel, either pelican hooks or a pelican hook and a jaw threadedly received in the inserts, and a ratchet handle operatively attached to the ratchet barrel for turning the ratchet barrel to cause the pelican hooks or pelican hook and jaw (or eyes, jaws, or stub ends suitable for attachment such as by welding) to ratchet closer together.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a sectional, elevation view of the preferred embodiment of the apparatus of the present invention;

FIGS. 2A, 2B are partial, sectional views of the preferred embodiment of the apparatus of the present invention;

FIG. 3 is a fragmentary perspective view of the preferred embodiment of the apparatus of the present invention illustrating the sleeve;

DETAILED DESCRIPTION OF THE INVENTION

Figure 4:
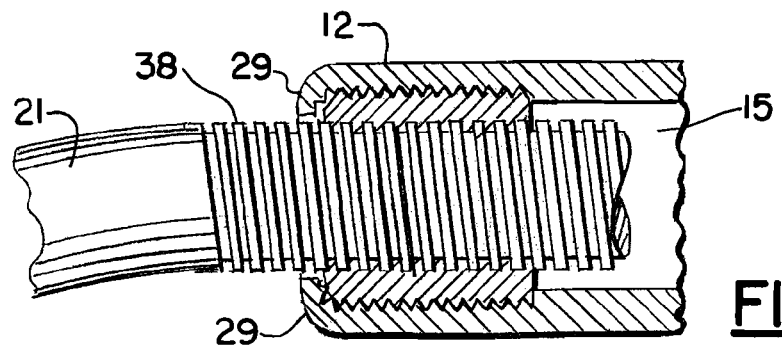
FIG. 4 is a partial perspective view of the preferred embodiment of the apparatus of the present invention.
Figure 5:
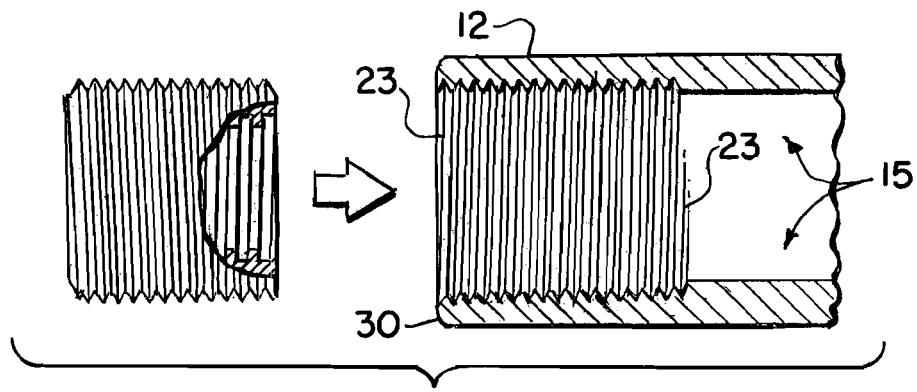
FIG. 5 is a partial, sectional, exploded view of the preferred embodiment of the apparatus of the present invention.
Figure 6:
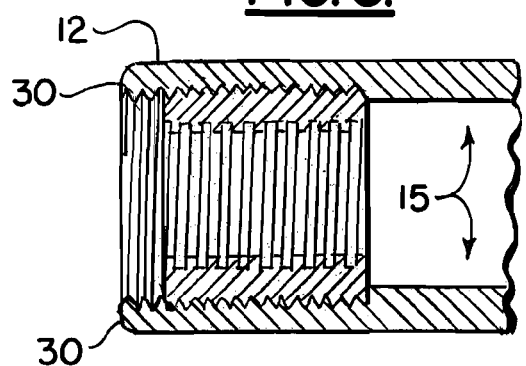
FIG. 6 is a partial sectional view of the preferred embodiment of the apparatus of the present invention.
Figure 7:
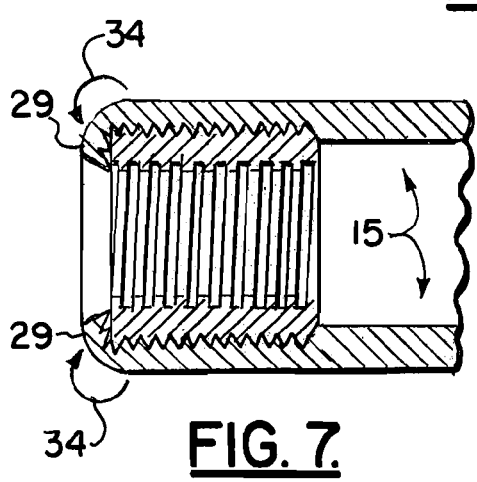
FIG. 7 is a partial sectional view of the preferred embodiment of the apparatus of the present invention.
Figure 8:
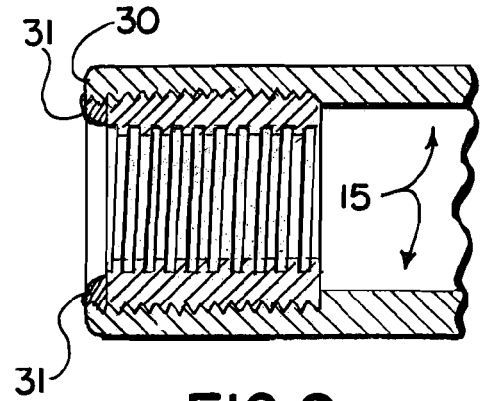
FIG. 8 is a partial sectional view of the preferred embodiment of the apparatus of the present invention.

FIGS. 1-8 show the preferred embodiment of the apparatus of the present invention, designated generally by the numeral 10 in FIG. 1. Load binder apparatus or river ratchet 10 provides an elongated tubular body 11 having a first end portion 12 and a second end portion 13. In between the end portions 12, 13 there is mounted a ratchet mechanism 14 which is a known mechanism.

The ratchet mechanism 14 includes a handle 32. Handle 32 can be moved in a reciprocating fashion by a user that grips the handle 32 and moves it toward or away from his or her body during use. A tubular bore is provided at each end portion of the tubular body 11. Bore 15 is provided at end portion 12. Bore 16 is provided at end portion 13.

A pair of hook members (e.g. pelican hooks—though one could substitute other attachment members for one or both of the hooks, such as a jaw, or eye, jaw, or stub end suitable for attachment such as by welding, and there can be two of each of these alternative attachment members or any combination of two of any of these attachment members) are provided for pulling two parts of a load together. Each hook 17, 18 is pivotally connected to a shaft section. Hook 17 is pivotally connected at connection 19 to shaft 21. Hook 18 is pivotally connected at connection 20 to shaft 22. Shaft 21 has threads 38. Shaft 22 has threads 43.

Each bore section 15, 16 is internally threaded. The bore section 15 has an internally threaded section 23. The bore section 16 has an internally threaded section 24. The threaded sections 23, 24 can be the same thread pattern.

Sleeves 25A and 25B are provided for fitment to each of the bore sections 15, 16. The sleeve 25A has an internal thread 28 at sleeve bore 26. The sleeve 25A has a sleeve external thread 27 that engages the internally threaded section 23 of a bore section 15. Sleeve 25B has internal thread 33 and external thread 34 that engages the internally threaded section 24 of bore section 16. For the internal threads 28, 33 different threads are provided to achieve a turnbuckle effect when the ratchet mechanism is operated. Thus, for the internal threads 28, 33 one is a left-hand thread and the other is a right-hand thread. Threads 38 of shaft 21 engage threads 28 of insert or sleeve 25A and threads 43 of shaft 22 engage threads 33 of insert or sleeve 25B.

In order to retain each sleeve 25A, 25B in its bore section 15, 16, an annular crimp 29 (see arrows 34, FIG. 7) can be used. Alternatively, a weld 31 (or welds) can secure each sleeve 25A, 25B to tubular body 11 (see FIG. 8). In any case, the annular crimp 29 or the weld 31 is positioned at an end 30 of tubular body 11 as shown in the drawings.

Thus, the apparatus of the present invention includes a river ratchet 10 in which the insides of the ends of the barrel 11 are threaded, and the outsides of the inserts 25A, 25B are threaded. This makes the connection much stronger, such that the ratchet 10 can be pulled a great deal without the inserts 25A, 25B pulling out. The inserts 25A, 25B can then be welded or otherwise secured to the barrel 11 just to keep the inserts 25A, 25B from unthreading.

Preferably, threads of internally threaded sections 23 and 24 and threads 27 and 34 are formed by cutting and inserts 25A and 25B and the ends 12 and 13 of barrel 11 can then be heat treated to strengthen the threads and the rest of the sleeve.

Rounded rectangular rings 45 and 46 serve to secure hooks 17 and 18 in the position shown in FIG. 1. Rounded rectangular rings 45 and 46 are moved out of engagement with hooks 17 and 18 by sliding them toward barrel 11.

Sleeves 25A and 25B preferably have between about 7 and 28 external threads per inch. The external threads of sleeves 25A and 25B are preferably machine screw threads. The internal threads of inserts 25A and 25B are preferably acme screw threads.

A nominal 1⅜" load binder 10, when made of rolled or forged steel, preferably is made to have a breaking strength of at least about 90,000 lbs. In a nominal 1⅜" load binder 10, inserts 25A and 25B are preferably at least 0.75 inch long, more preferably at least 1 inch long, more preferably at least 1.25 inch long, even more preferably at least 1.5 inch long, and still more preferably at least 2 inches long.

The following is a list of parts and materials suitable for use in the present invention.

| Part Number | PARTS LIST Description |
|---|---|
| 10 | load binder |
| 11 | tubular body or barrel (made of rolled or forged steel, such as round bar steel, or cast steel (less preferred)) |
| 12 | end portion |
| 13 | end portion |
| 14 | ratchet mechanism |
| 15 | bore |
| 16 | bore |
| 17 | hook (made of rolled or forged steel, such as round bar steel, or cast steel (less preferred)) |
| 18 | hook (made of rolled or forged steel, such as round bar steel, or cast steel (less preferred)) |
| 19 | pivotal connection |
| 20 | pivotal connection |
| 21 | shaft (made of rolled or forged steel, such as round bar steel, or cast steel (less preferred)) |
| 22 | shaft (made of rolled or forged steel, such as round bar steel, or cast steel (less preferred)) |
| 23 | internally threaded section of barrel or tubular body 11 |
| 24 | internally threaded section of barrel or tubular body 11 |
| 25A | sleeve or insert (made of rolled or forged steel, such as round bar steel, or cast steel (less preferred)) |
| 25B | sleeve or insert (made of rolled or forged steel, such as round bar steel, or cast steel (less preferred)) |

-continued

PARTS LIST

| Part Number | Description |
| --- | --- |
| 26 | sleeve bore |
| 27 | external thread of insert or sleeve 25A |
| 28 | internal thread of insert or sleeve 25A |
| 29 | annular crimp |
| 30 | tubular body end |
| 31 | weld (made of steel alloy, e.g.) |
| 32 | handle (made of rolled or forged steel, such as round bar steel, or cast steel (less preferred)) |
| 33 | internal thread of insert or sleeve 25B |
| 34 | external thread of insert or sleeve 25B |
| 38 | threads of shaft 21 |
| 43 | threads of shaft 22 |
| 45 | rounded rectangular rings (made of forged steel or cast steel, e.g.) |
| 46 | rounded rectangular rings (made of (forged steel or cast steel, e.g.) |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A load binder, comprising:
  a) an axially extending tubular body having opposed end portions, a central longitudinal bore and internally threaded sections at the opposed end portions;
  b) a pair of sleeves that are fitted to respective of the tubular body ends, each sleeve having an outer threaded portion with external threads that engage the internally threaded sections of the body at the tubular body end, one sleeve having a right-hand internal thread, the other sleeve having a left-hand internal thread;
  c) first and second threaded attachment members, one attachment member having external threads that engage the internal right-hand thread, the other attachment member having external threads that engage the internal left-hand thread; and
  d) a ratchet wrench mechanism coupled to the tubular body and having a handle with a gripping surface, said mechanism enabling the tubular body to be rotated responsive to a reciprocating movement of the handle.

2. The load binder of claim 1 wherein the sleeve external threads and internal threads are different thread patterns.

3. The load binder of claim 2 wherein the sleeve internal threads are an acme thread pattern.

4. The load binder of claim 2 wherein the sleeve internal threads are a machine thread pattern.

5. The load binder of claim 1 wherein each tubular body end is crimped at the end to provide a smaller diameter portion that disallows removal of a sleeve from the bore.

6. The load binder of claim 1 further comprising a weld that connects each sleeve to the tubular body.

7. The load binder of claim 1 wherein each sleeve has a length of at least 0.75 inch.

8. The load binder of claim 1 wherein each sleeve has a length of at least one inch.

9. The load binder of claim 1 wherein each sleeve has a length of at least 1.25 inch.

10. The load binder of claim 1 wherein each sleeve has a length of at least 1.50 inch.

11. The load binder of claim 1 wherein each sleeve has a length of at least two inches.

12. The load binder of claim 1 wherein the sleeve external threads have between about 7 and 28 threads per inch.

13. The load binder of claim 1 wherein the sleeve external threads have at least 7 threads per inch.

14. The apparatus of claim 1, wherein the attachment members are from the group consisting of eyes, hooks, pelican hooks, jaws, and stub ends.

15. The apparatus of claim 14, wherein the attachment members are the same.

16. The apparatus of claim 1 wherein each insert is threaded with said outer threaded portion along a majority of its length.

17. Apparatus including a river ratchet used to connect together two wire ropes and then ratchet them together to make connections on barges, the ratchet including:
  a ratchet barrel having a pair of internally threaded ends;
  a pair of inserts, each internally and externally threaded, each insert having external threads that threadedly insert into a said internally threaded end of the ratchet barrel;
  attachment members threadedly received in the inserts, wherein each attachment member has external threads that engage the internal threads of an insert; and
  a ratchet handle operatively attached to the ratchet barrel for turning the ratchet barrel to cause the attachment members to ratchet closer together.

18. The apparatus of claim 17, wherein the attachment members are either pelican hooks or a pelican hook and a jaw; and
  the ratchet handle causes the pelican hooks or pelican hook and jaw to ratchet closer together.

19. The apparatus of claim 17, wherein the inserts are secured to the barrel to keep the inserts from unthreading from the barrel.

20. The apparatus of claim 17, wherein the inserts are welded to the barrel to keep the inserts from unthreading from the barrel.

21. The apparatus of claim 17, wherein the ratchet barrel has ends which are rolled inward to keep the inserts from unthreading from the barrel.

22. The apparatus of claim 17, wherein the insert external threads are spaced between about 7 and 28 threads per inch.

23. The apparatus of claim 17, wherein the insert external threads are spaced at least 7 threads per inch.

24. The apparatus of claim 17 wherein each insert is threaded with said outer threaded portion along a majority of its length.

* * * * *